US011828331B2

(12) United States Patent
Raveggi et al.

(10) Patent No.: US 11,828,331 B2
(45) Date of Patent: Nov. 28, 2023

(54) BEARING WITH PADS HAVING COOLING MICRO-CHANNELS THEREIN, AND METHOD

(71) Applicant: NUOVO PIGNONE TECNOLOGIE—S.R.L., Florence (IT)

(72) Inventors: Marco Raveggi, Florence (IT); Stefano Franchi, Florence (IT); Valentina Pivetta, Florence (IT); Daniele Panara, Florence (IT)

(73) Assignee: Nuovo Pignone Tecnologie—S.R.L., Florence (IT)

( * ) Notice: Subject to any disclaimer, the term of this patent is extended or adjusted under 35 U.S.C. 154(b) by 49 days.

(21) Appl. No.: 17/596,006

(22) PCT Filed: Jun. 3, 2020

(86) PCT No.: PCT/EP2020/025259
§ 371 (c)(1),
(2) Date: Dec. 1, 2021

(87) PCT Pub. No.: WO2020/244807
PCT Pub. Date: Dec. 10, 2020

(65) Prior Publication Data
US 2022/0260118 A1 Aug. 18, 2022

(30) Foreign Application Priority Data

Jun. 4, 2019 (IT) .................. 102019000007995

(51) Int. Cl.
*F16C 37/00* (2006.01)
*F16C 17/03* (2006.01)
*F16C 17/06* (2006.01)

(52) U.S. Cl.
CPC ............ *F16C 37/002* (2013.01); *F16C 17/03* (2013.01); *F16C 17/06* (2013.01); *F16C 2380/26* (2013.01)

(58) Field of Classification Search
CPC ......... F16C 17/03; F16C 17/06; F16C 37/002
See application file for complete search history.

(56) References Cited

U.S. PATENT DOCUMENTS

| 9,874,247 B2 | 1/2018 | Wang et al. |
| 2002/0051592 A1 | 5/2002 | Ferguson |
| 2009/0080820 A1* | 3/2009 | Matyscak ............. F16C 33/108 384/293 |
| 2016/0265590 A1 | 9/2016 | Sano |

FOREIGN PATENT DOCUMENTS

| EP | 1002965 | * 11/1998 |
| EP | 3236090 A1 | 10/2017 |
| EP | 3236094 A1 | 10/2017 |
| JP | 6494065 | * 4/2019 |
| WO | 2018/077884 A1 | 5/2018 |

OTHER PUBLICATIONS

Translation of EP1002965 obtained May 15, 2023.*

* cited by examiner

*Primary Examiner* — James Pilkington
(74) *Attorney, Agent, or Firm* — Paul Frank + Collins P.C.

(57) ABSTRACT

The bearing has a housing and a plurality of pads coupled with the housing. The pads form bearing surfaces facing a shaft receiving space. The pads are provided with cooling micro-channels formed therein, adapted to circulate lubrication fluid and improve heat removal.

20 Claims, 7 Drawing Sheets

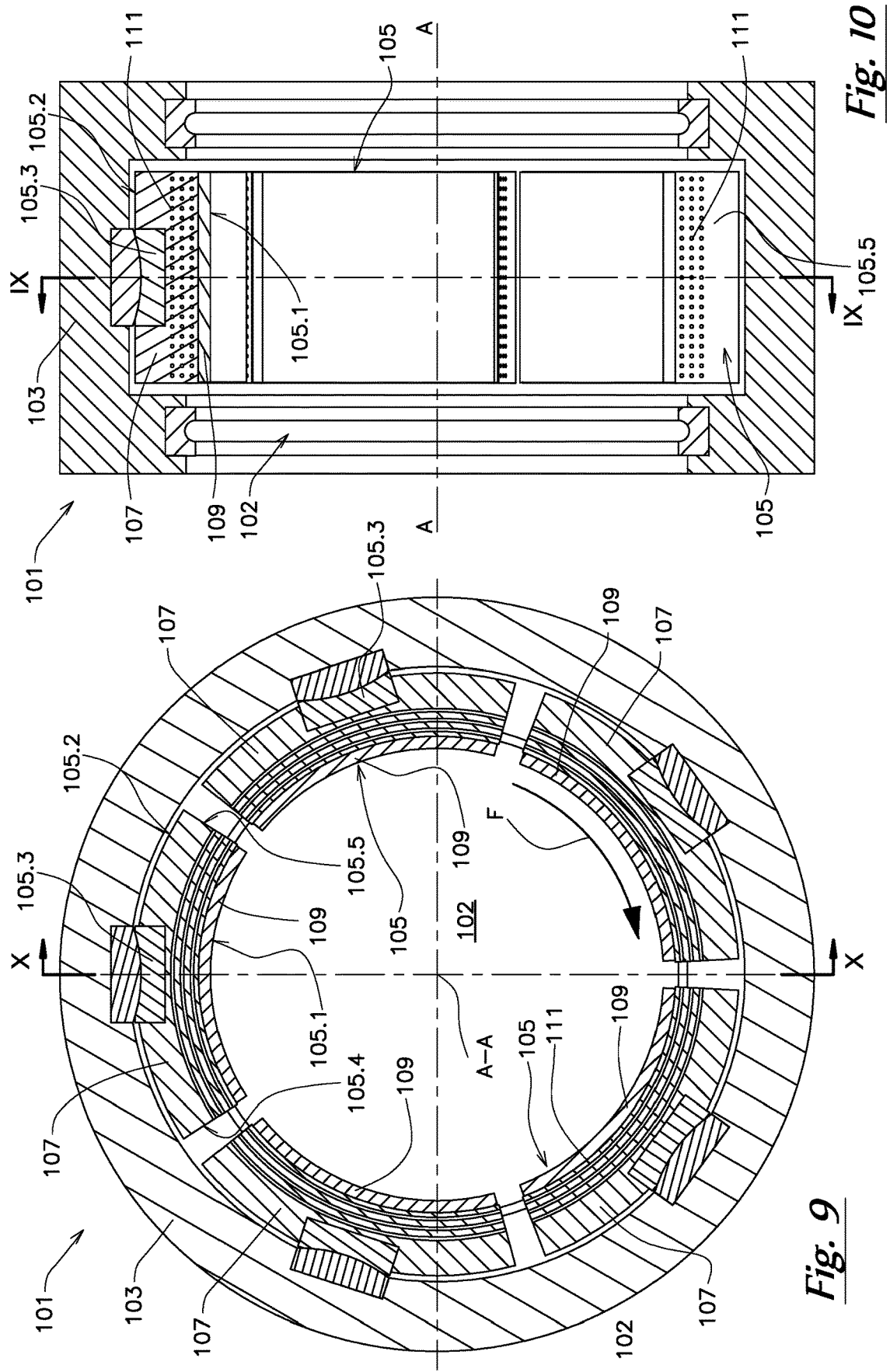

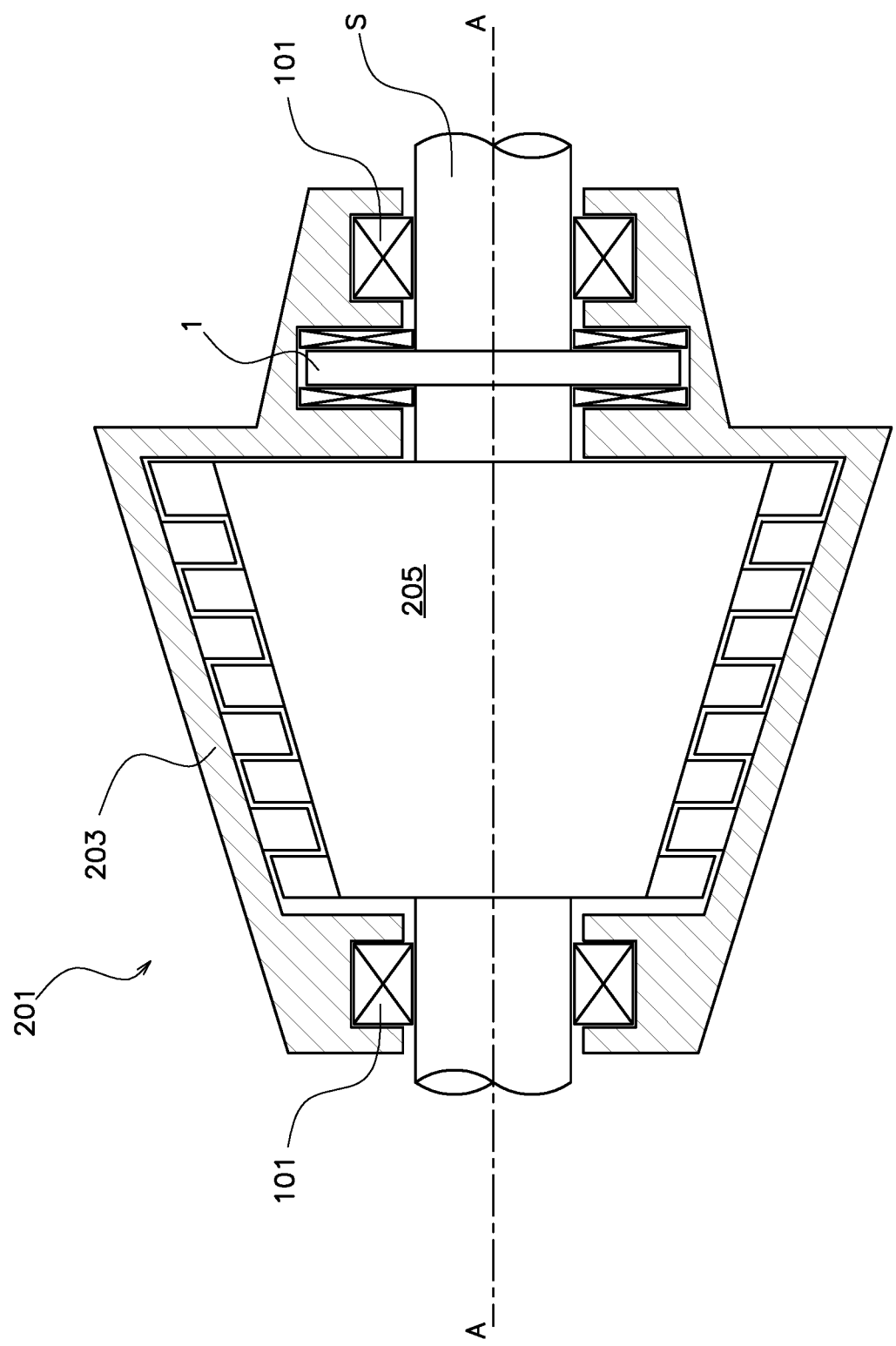

```
┌─────────────────────────────────────────────┐
│  Rotating the shaft in the shaft receiving space │
│  while supplying lubricant fluid between the │
│  housing structure and the rotating shaft.  │
└─────────────────────────────────────────────┘
                      │
                      ▼
┌─────────────────────────────────────────────┐
│  Forming a hydrodynamic lubrication wedge   │
│  between the bearing surface of the pads and│
│            a shaft surface.                 │
└─────────────────────────────────────────────┘
                      │
                      ▼
┌─────────────────────────────────────────────┐
│  Forcing lubrication fluid to flow through  │
│        the cooling micro-channels.          │
└─────────────────────────────────────────────┘
```

*Fig. 12*

BEARING WITH PADS HAVING COOLING MICRO-CHANNELS THEREIN, AND METHOD

TECHNICAL FIELD

The present disclosure relates to bearings for supporting shafts rotating around an axis. More specifically, the present disclosure relates to radial or thrust bearings with a plurality of pads, preferably tilting pads coupled with a bearing housing. The present disclosure further relates to a method of operating a bearing, as well as to a method of manufacturing a bearing and to a machine including at least one bearing.

BACKGROUND ART

In fluid bearings, a rotary shaft is typically supported on a thin layer of liquid or gaseous lubrication fluid, which acts between a bearing surface of the fluid bearing and a shaft journal. Fluid bearings can be broadly classified in hydrodynamic bearings and hydrostatic bearings. In hydrostatic bearings, a highly pressurized fluid, such as oil, may prevent a direct contact between the shaft surface and the bearing surface. In hydrodynamic bearings, the rotary shaft moves at a high speed with respect to the bearing surface such as to pressurize the fluid in a lubricating wedge between the shaft and the bearing surface. The lubricating wedge forms around the rotating shaft, and hydrodynamic lubrication is obtained when the bearing surface and the mating shaft surface are completely separated by a cohesive film of lubricant therebetween.

Whereas hydrostatic bearings typically rely on an external pump for pressurizing the fluid at a static pressure, the pressure in hydrodynamic bearings may be maintained by the rotation of the shaft. Hydrodynamic bearings may have high friction at low speed, before the lubricating wedge is formed, and may therefore be used for high-speed applications where starts and stops of the shaft are not frequent. The bearing may then be operated continuously in a hydrodynamic lubrication mode.

Tilting pad bearings exist both as hydrostatic bearings and as hydrodynamic bearings. Further, tilting pad bearings exist both as radial or journal bearings as well as axial or thrust bearings. Radial bearings include tilting pads spaced around an axis of the shaft. The tilting pads may be coupled with a bearing housing such as to be tiltable with respect to a respective tilting axis which may extend parallel to the axis of the shaft. The bearing surfaces of the tilting pads may be directed toward a shaft housing space where the shaft is to be supported. In operation, the rotating shaft may carry the lubricant to the bearing surfaces of the tilting pads through viscous drag. The pressure of the lubricant between the bearing surface and the shaft may lead to a slight tilt of the tilting pads with respect to the tilting axis of the pads, and a wedge of pressurized lubricant may form between the shaft and the bearing surface. The tilt of the pads may change depending on the bearing load and speed.

One problem encountered with fluid bearings, both hydrodynamic as well as hydrostatic, is the increase of temperature of the bearing components, including the pads, due to friction. Temperature values which may be detrimental can be reached especially under high speed and/or high load operating conditions. Lubricant fluid can be used to remove heat from the bearing. Cooling is obtained in that the lubricant fluid, such as oil, contacts the outer surfaces of the pads and removes heat therefrom. However, the interior of the pads cannot be reached by the cooling oil, such that only inefficient cooling is obtained.

U.S. Pat. No. 9,874,247 discloses fluid bearings having tilting pads which are provided with a network of cooling ducts formed therein. The pads are manufactured by additive manufacturing. At least one oil injection nozzle is provided for each pad, to supply pressurized oil from a pump into the network of cooling ducts. The use of an oil injection nozzle makes the bearing complex and requires large cooling ducts. The large cross section of the ducts requires support structures in the cooling ducts, to prevent collapsing of the pad under the high-load operating conditions. The duct support structures reduce cooling oil circulating through the cooling ducts and add to the complexity of the bearing.

EP3236090 and EP3236094 disclose a bearing for a gas turbine, including bearing pads. Each bearing pad includes at least one gas inlet and aa plurality f gas outlets configured on the inner surface of the pad. The gas inlet is in fluid communication with the plurality of gas outlets via a gas distribution labyrinth formed in the pad. Gas is fed to the bearing pads through a gas inlet arranged on the bearing housing, fluidly coupled to an external gas source. The gas fed by the gas source through the gas outlets provides a load bearing function. Operation of the bearing is thus dependant upon the presence of an outer gas source.

A similar arrangement is disclosed in WO2018/077884 and US2002/0051592. In both these publications fluid is fed through a fluid inlet by an external fluid source.

In the above mentioned prior art publications fluid flowing through the channels formed in the pads is directly fed into the channels by an external source.

US2016/0265590 discloses a bearing and relevant bearing pads, The bearing pads are provided with conduits extending from a first, inlet opening to a second, outlet opening. In order to promote fluid circulation through the conduits, the inlets thereof are arranged on the bearing surface of the pad, i.e the bearing facing the rotary shaft, and defining therewith a meatus, where a fluid pressure is generated. The fluid pressure supports the shaft in rotation without contact between the shaft and the bearing surface. In this way, circulation of the fluid in the conduits does not require connection to an external fluid source. Rather, the hydraulic head required to promote fluid circulation through the conduit is provided by the differential pressure between the bearing surface and the back surface of the pad.

While the bearing disclosed in US2016/0265590 has the advantage of not having to rely upon an external fluid source, the bearing fluid entering the conduit from the bearing surface negatively affects the overall load capacity of the bearing. The fluid flow through the conduit inlet reduces the fluid pressure in the meatus between the bearing surface and the rotating shaft.

Accordingly, it would be beneficial to provide a fluid bearing with an efficient pad cooling arrangement, as well as a method for the production and use thereof.

SUMMARY

Disclosed herein is a fluid bearing, for instance a hydrodynamic bearing, for supporting a shaft rotating around a bearing axis and including a housing structure and a plurality of pads directly or indirectly connected to, i.e. coupled with the bearing structure. In some embodiments, the pads are tilting pads. Each pad includes a bearing surface, adapted to co-act with a rotary shaft supported by the bearing, and an opposite back surface directed towards the housing structure. Between the housing structure and a shaft receiving space a lubrication fluid volume is provided. In operation, the lubrication fluid volume is filled with lubrication fluid circulating therein. To enhance heat removal from the bearing, each pad includes a plurality of cooling micro-channels. Each cooling micro-channel has an inlet end and an outlet end in fluid communication with the lubrication fluid volume. The cooling micro-channels are oriented such that circulation of lubrication fluid in the lubrication fluid volume promotes flow of the lubrication fluid through the cooling micro-channels.

The inlet of the micro-channels is arranged on a leading side end of the pad, rather than on the bearing surface thereof. It has been surprisingly discovered, that such arrangement ensures fluid circulation through the micro-channels without diminishing the load capacity of the bearing.

The lubrication fluid circulating in the cooling micro-channels provides efficient heat removal. An external lubrication fluid pump for circulating the lubrication fluid in the cooling micro-channels is not required Also disclosed herein is rotary machine including: a casing; a rotor arranged for rotation in the casing and supported by at least one fluid bearing as defined above.

According to a further aspect, disclosed herein is a method of operating a fluid bearing provided with cooling micro-channels as set forth above. The method includes the step of rotating a shaft in the shaft receiving space of the bearing while supplying lubricant fluid between the housing structure and the rotating shaft such as to provide a hydrodynamic lubrication wedge between the bearing surface of the pads and a shaft surface. The method further includes the step of forcedly circulating lubrication fluid through the cooling micro-channels. Circulation of the lubrication fluid is promoted and supported by the action of the rotating shaft.

According to yet another embodiment, the present disclosure concerns a method of manufacturing a bearing for supporting a shaft rotating around an axis, the bearing including a plurality of pads, wherein each pad is coupled with a housing structure and comprises a bearing surface. The method includes the step of manufacturing the pads by additive manufacturing with a plurality of cooling micro-channels extending therein and having an inlet end and an outlet end on outer surfaces of the pads.

Further aspects, advantages, and features of the present disclosure are apparent from the dependent claims, the description, and the accompanying drawings.

BRIEF DESCRIPTION OF THE DRAWINGS

So that the manner in which the above recited features of the present disclosure can be understood in detail, a more particular description of the disclosure, briefly summarized above, may be had by reference to embodiments. The accompanying drawings relate to embodiments of the disclosure and are described in the following. Some embodiments are depicted in the drawings and are detailed in the description which follows. In the drawings:

FIG. 9 illustrates a schematic sectional view of a radial bearing according to the present disclosure according to line IX-IX of FIG. 10;

FIG. 10 illustrates a schematic sectional view of the radial bearing according to line X-X of FIG. 9;

FIG. 11 illustrates a schematic of a turbomachine including a thrust bearing and radial bearings according to the present disclosure; and FIG. 12 illustrates a flow chart of a method of operating a bearing according to the present disclosure.

DETAILED DESCRIPTION

A new fluid bearing is disclosed herein, with an improved cooling arrangement for removing heat from the bearing pads. The pads are coupled with a housing structure and are each provided with a bearing surface facing a shaft which is rotatably supported by the bearing. The load is supported by a thin layer of pressurized lubrication liquid or gas between the bearing surface of the pads and the shaft surface. The lubrication fluid circulates in the inner volume of the bearing where the pads are housed. Each pad is provided with a plurality of cooling micro-channels. Each cooling micro-channel has an inlet end and an outlet end. The inlet and outlet ends of the cooling micro-channels opens in the inner volume of the bearing, in which the lubrication fluid circulates, such that during operation of the bearing lubrication fluid forcedly circulates in the cooling micro-channels providing efficient heat removal from the pads. The pads are advantageously manufactured by additive manufacturing, to provide cooling micro-channels of suitable dimension and shape. Specifically, the inlet of the micro-channels are located along a trailing side surface of the respective pad, such that fluid circulation through the micro-channels does not diminish the fluid pressure in the meatus between the rotary shaft and the bearing surface of the pad.

It has been surprisingly noted that by providing cooling micro-channels as disclosed herein, the bearing can be efficiently cooled even if less performing materials are used for the manufacturing of the pads. According to the current art, to promote heat removal metals having a high theirs al conductivity are used, such as copper-chromium. These highly performing materials are expensive. Using cooling micro-channels as disclosed herein, the pad temperature during operation of the bearing can be lowered using thermally less performing and thus less expensive materials, such as steel.

Figure 1:
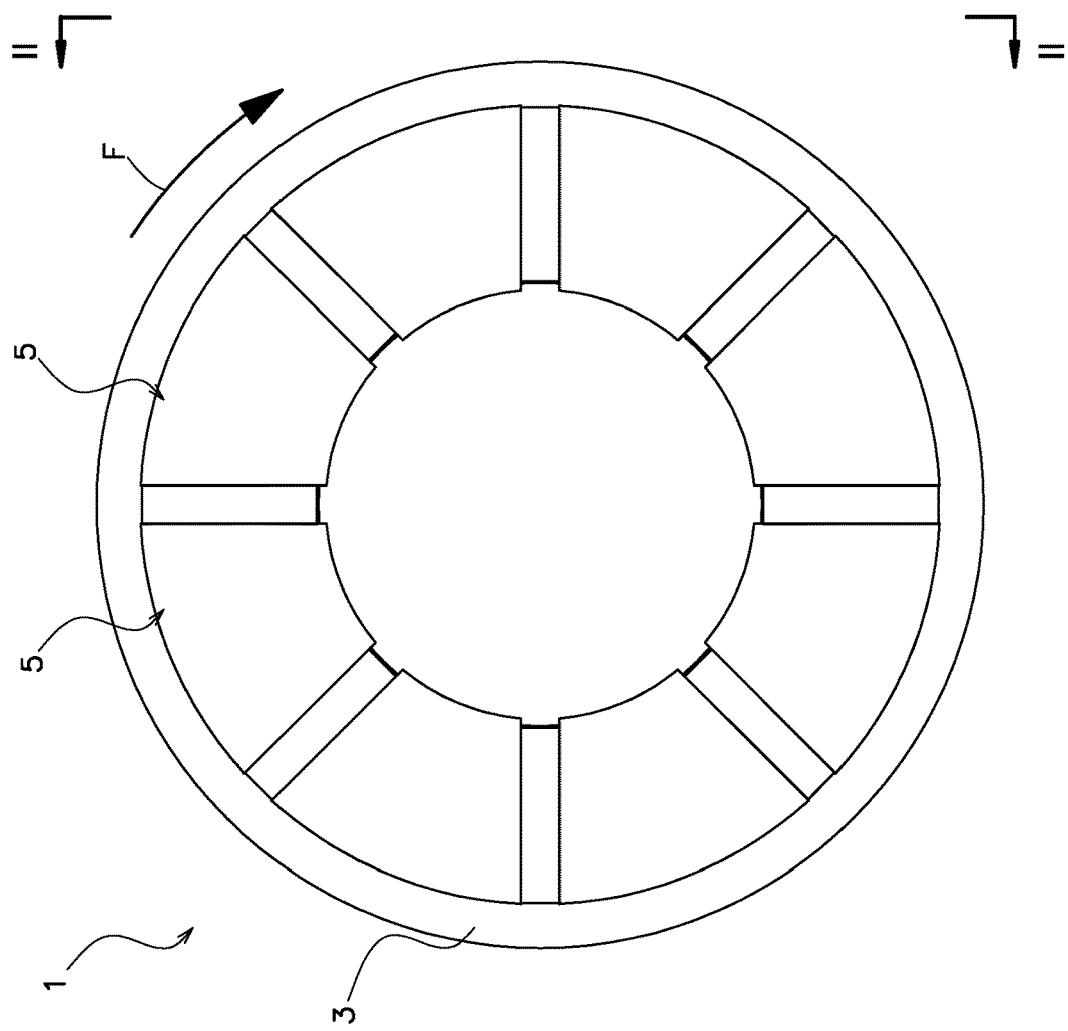
FIG. 1 illustrates a plan view of a thrust bearing according to the present disclosure, according to line I-I in FIG. 2.
Figure 2:
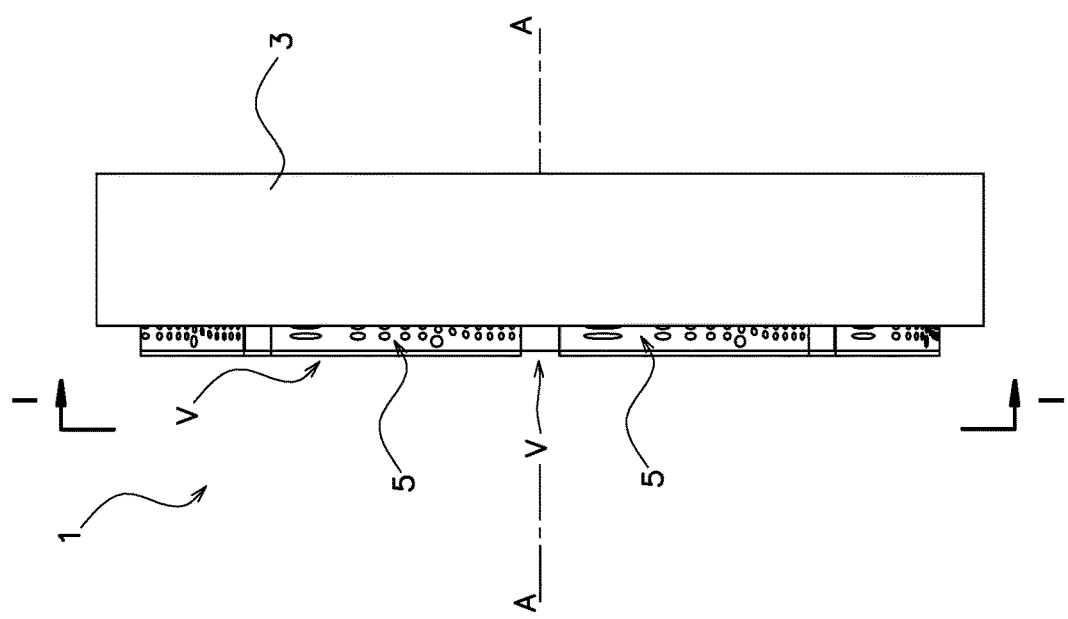
FIG. 2 illustrates a side view of the thrust bearing of FIG. 1 according to line II-II in FIG. 1.

Turning now to the drawings, FIGS. 1, 2, 3, 4, 5, 6, 7 and 8 illustrate a first embodiment of a fluid bearing according to the disclosure. In this embodiment the bearing is configured as a thrust bearing 1. FIG. 1 shows a plan view of the bearing 1 and FIG. 2 illustrates an external side view of the bearing 1.

The bearing 1 includes a housing structure 3 including a ring extending around an axis A-A of the bearing 1. The bearing axis A-A coincides with the rotary axis of a shaft supported by the bearing 1.

A plurality of pads 5 are coupled with the housing structure 3. In the illustrated embodiments the pads 5 are tilting pads and can be coupled with the housing structure 3 in any one of several possible known manners. In some embodiments (not shown) the tilting pads 5 can be manufactured integrally with the housing structure 3 by additive manufacturing, providing a flexible web connecting the pads to the housing structure 3, as disclosed e.g. in WO2018/077884.

Figure 3:
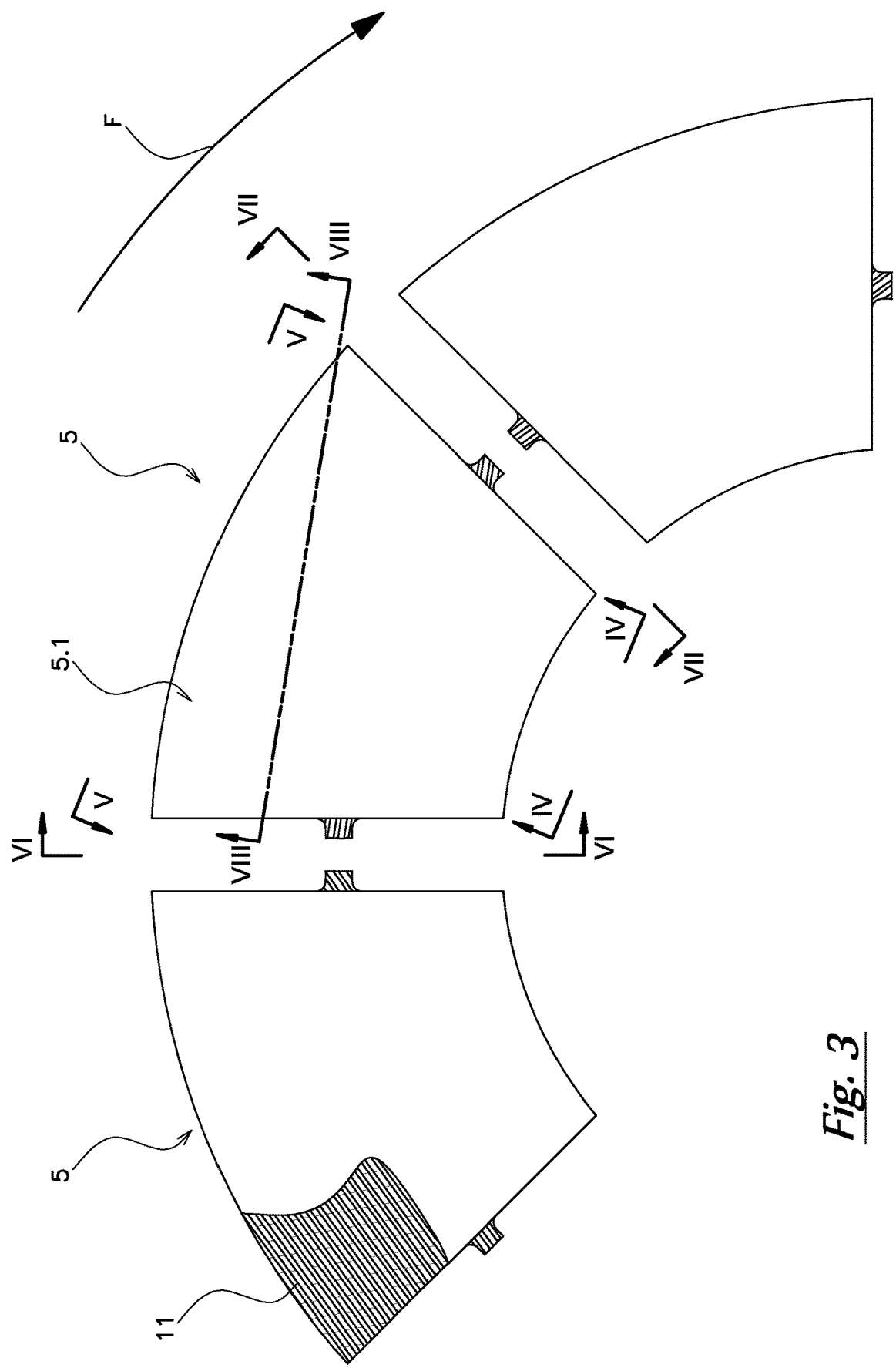
FIG. 3 illustrates a top view of some tilting pads of the thrust bearing of FIG. 1 shown in isolation.
Figure 4:
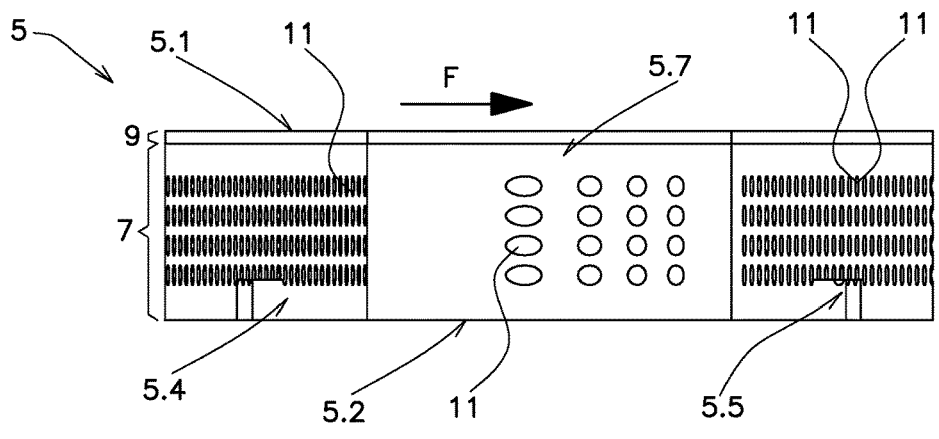
FIG. 4 illustrates a side view according to line IV-IV of FIG. 3.

FIG. 3 illustrates a plan view of three tilting pads in isolation in a top plan view. One of the pads is shown with the upper layer partly removed. FIGS. 4, 5, 6, 7 and 8 show side views and a sectional view of a tilting pad. These figures show details of a cooling arrangement to remove heat from the pad 5.

Each pad 5 includes an essentially planar bearing surface 5.1 and a back surface 5.2, at which connecting devices 5.3 for connecting the pad 5 to the housing structure 3 are provided. Each pad 5 further includes four side surfaces, shown in detail in FIGS. 4, 5, 6 and 7. More specifically, each pad 5 includes a substantially planar leading side surface 5.4 extending in a radial direction, and a substantially planar trailing side surface 5.5 extending in a radial direction. The definition "leading" and "trailing" are referred to the direction of rotation of the shaft S (FIG. 11, described later on) supported by the bearing and to the direction of the flow of the lubrication fluid in the bearing 1. The direction of rotation is indicated by arrow F in the drawings. Specifically, the leading side surface is upstream of the trailing side surface with respect to the flow of the lubrication fluid. Each pad 5 further includes a substantially cylindrical circumferential outer side surface 5.6 and a substantially cylindrical circumferential inner side surface 5.7. The leading side surface 5.4 and the tailing side surface 5.5 extend between the circumferential inner surface 5.7 and the circumferential outer surface 5.6.

The bearing surfaces 5.1 of the pads 5 are oriented towards a shaft receiving space, wherein the shaft S (FIG. 11, described below) or part thereof is located. A lubrication fluid volume V is formed between the shaft S and the bearing structure 3. The lubrication fluid volume V is filled with lubrication fluid, typically oil, for instance. In operation, the shaft S rotates at high speed around the axis A-A of the bearing 1 and drags a flow of lubrication fluid along the clearance between the shaft S and the bearing surfaces 5.1 of the pads 5, such that direct contact between the outer surface of shaft S and the pads 5 is avoided. Lubrication fluid flows according to arrow F in the lubrication fluid volume V under the dragging action of the rotating shaft S.

In a hydrodynamic bearing, as illustrated herein, lubrication fluid is continuously supplied to the bearing 1 by an external pump, not shown, such that the lubricant fluid is continuously removed and replaced. The continuous lubrication fluid flow provides a cooling action.

In some embodiments, the bearing 1 can be a hydrostatic bearing, wherein lubrication fluid is continuously supplied to the bearing at high pressure, to provide a bearing action.

Each pad 5 can be comprised of a core layer 7 and a coating layer 9, which forms the bearing surface 5.1. In some embodiments, the coating layer 9 can be made of white metal or Babbit metal and forms a low friction bearing surface 5.1. As known to those skilled in the art, a Babbit metal is any of several metal alloys used for the bearing surface in a fluid bearing.

The core layer 7 can be made of a single metal, for instance steel or aluminum, or may be made of different metallic materials, such as chromium and copper. In some embodiments, different materials can be arranged in sequence, to form a multi-layer structure with materials having different thermal conductibility coefficients, thus optimizing heat removal.

By manufacturing the pads 5 with an additive manufacturing process, such as by selective laser melting or laser sintering, the core layer 7 can be formed of sub-layers of different materials, starting from a lower sub-layer forming the back surface 5.2 and ending with the last sub-layer foaming the interface with the coating layer 9.

Each pad 5 is provided with a plurality of cooling micro-channels 11. Each cooling micro-channel 11 has a first end and a second end surfacing on two of the side surfaces of the relevant pad 5. More specifically, as best shown in FIGS. 3, 4, 5, 6, 7 and 8, some of the cooling micro-channels 11 have an inlet end on the leading side surface 5.4 and an outlet end on the trailing side surface 5.5. Some cooling micro-channels 11 have an inlet end on the leading side surface 5.4 and an outlet end on the circumferential outer side surface 5.6. Further cooling micro-channels have an inlet end on the circumferential inner side surface 5.7 and an outlet end on the trailing side surface 5.5.

In general, the inlet ends of the cooling micro-channels 11 are arranged upstream of the outlet end thereof according to the direction of flow of the lubricant fluid in the lubrication fluid volume V, and therefore according to the direction of rotation of the shaft S. Moreover, the cooling micro-channels 11 are broadly inclined in an outward direction, such that the inlet end of each cooling micro-channel 11 is located at a first distance from the axis A-A of the bearing 1 and the outlet end of each cooling micro-channel 11 is located at a second distance from the axis A-A, the second distance being greater than the first distance.

In some embodiments, the cooling micro-channels 11 may be straight, as shown e.g. in FIG. 3. In other embodiments, the cooling micro-channels 11 may have a curved shape in a plan view. For instance each cooling micro-channel 11 may extend according to a portion of a spiral laying in a plane orthogonal to the axis A-A of the bearing 1. In general, it is beneficial for the cooling micro-channels 11 to have any shape which promotes, enhances or facilitates the forced circulation of lubrication fluid therethrough under the co-action of the rotating shaft supported by the bearing 1 and the pads 5 of the bearing 1. For instance, the cooling micro-channels 11 may have the shape of an arc of a circumference, or a hyperbolic, parabolic or a 3D shape.

Figure 6:
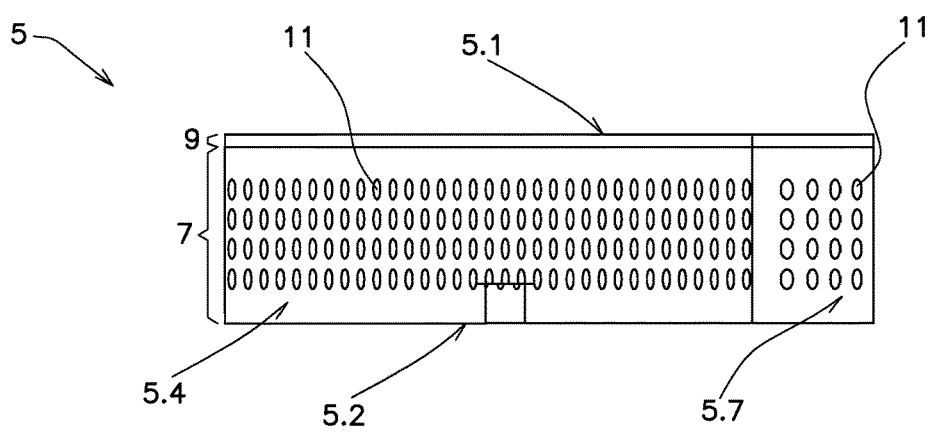
FIG. 6 illustrates a side view according to line VI-VI of FIG. 3.
Figure 7:
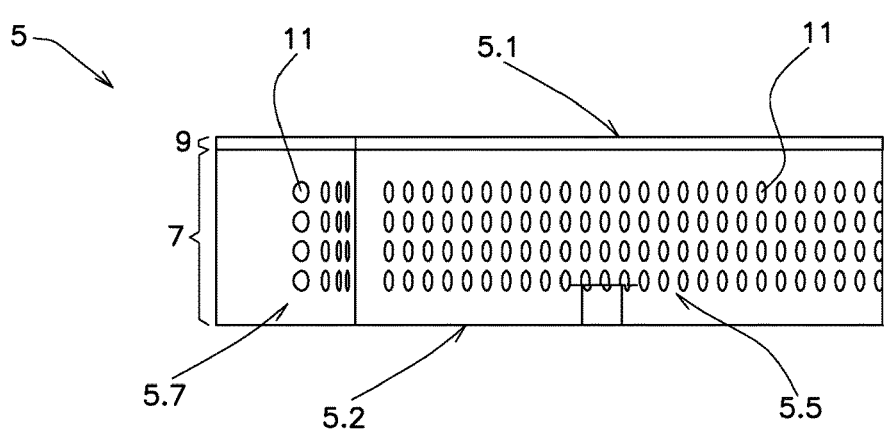
FIG. 7 illustrates a side view according to line VII-VII of FIG. 3.
Figure 8:
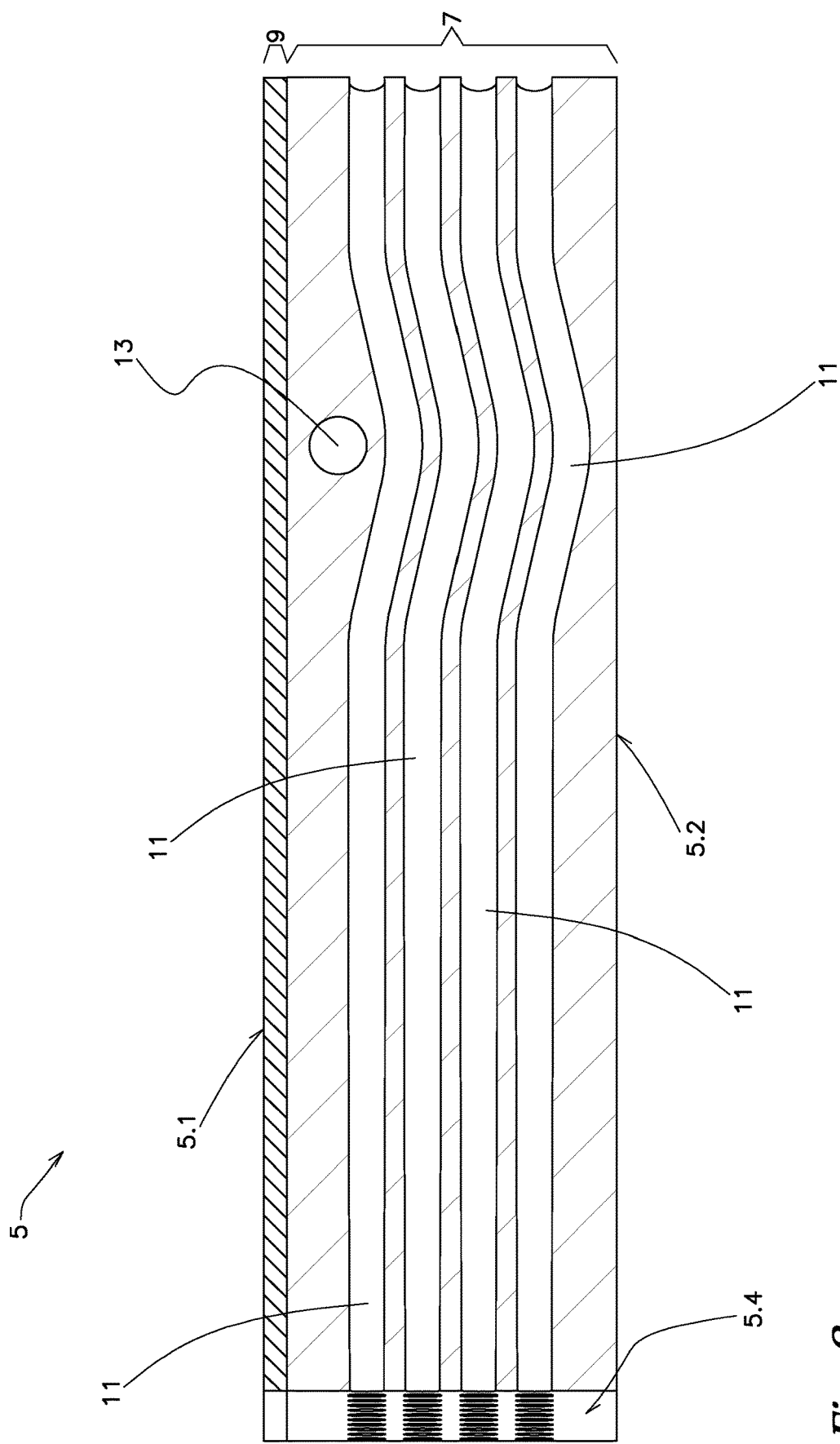
FIG. 8 illustrates a sectional view according to line VIII-VIII of FIG. 3.

In some embodiments, as best shown for instance in FIGS. 6 and 7, the cooling micro-channels 11 are arranged according to a matrix. In the embodiment illustrated in the attached drawings, the cooling micro-channels 11 are arranged according to a square mesh arrangement. In other embodiments, the cooling micro-channels 11 can be arranged according to a rhomboidal mesh arrangement. In general, the cooling micro-channels 11 are arranged according to rows at increasing distance from the bearing surface 5.1 of the respective pad 5, as can be seen e.g. in FIGS. 6 and 7. Moreover, the cooling micro-channels 11 can be also arranged according to columns at increasing distance from the bearing axis A-A.

The matrix distribution of the cooling micro-channels 11 results in efficient cooling of the entire volume of the pad 5.

As best shown in FIGS. 4, 5, 6, 7 and 8, the cooling micro-channels 11 are arranged according to layers. More specifically, the cooling micro-channels 11 can be arranged according to a plurality of layers, which are parallel to one another and arranged one next to the other along an axial direction, i.e. a direction parallel to the axis of the bearing 1. The cooling micro-channels 11 can further be arranged according to a plurality of layers which are arranged one next to the other in a radial direction, according to layers which are arranged at increasing radial distance from the axis A-A of the bearing 1.

Figure 5:
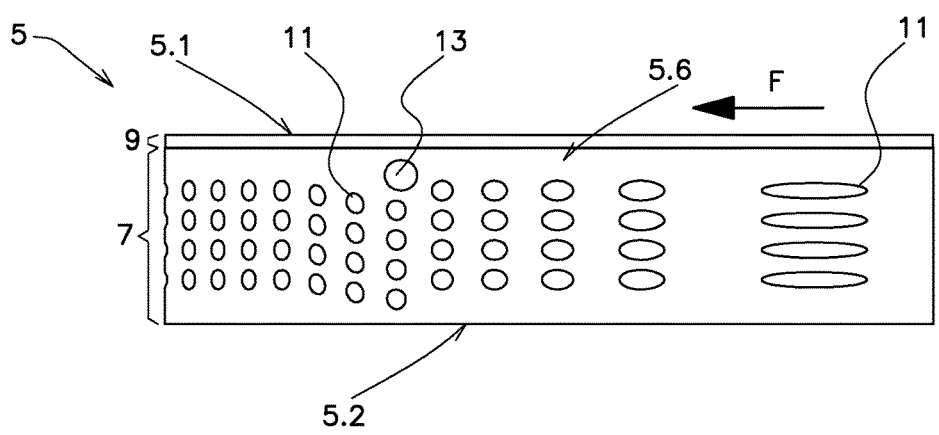
FIG. 5 illustrates a side view according to line V-V of FIG. 3.

In some embodiments one, some or all pads 5 can be provided with a seat 13 for a temperature sensor; see in particular FIG. 5. The cooling micro-channels 11 can be suitably shaped such as to extend around the seat 13 without intersecting the seat, so that the cooling lubricant flow does not alter the temperature detected by the temperature sensors housed in the seats 13.

The cooling micro-channels 11 can have a circular or preferably an elongated cross-section, for instance an elliptical cross section, as best shown in FIGS. 6 and 7. The cross section of the cooling micro-channels 11 has a major axis and a minor axis. In particularly advantageous embodiments, the major axis is parallel to the axis A-A of the bearing 1 and the minor axis is orthogonal to the axis A-A of the bearing 1. This shape increases the mechanical resistance of the pad 5 against crushing and also facilitates the manufacturing of the pad by additive manufacturing, since the direction of growth of the pad is parallel to the axis A-A of the bearing 1.

The major cross-sectional dimension of the cooling micro-channels 11 can be small, for instance in the range of about 0.5 mm to about 3.00 mm, preferably between about 1.00 mm and about 2.50 mm. If the cooling micro-channel 11 has an elliptical cross section, as in the exemplary embodiments disclosed herein, the major cross-sectional dimension thereof is the major axis of the elliptical cross section. If the cooling micro-channels have a circular cross section, the diameter of the cross section is the major dimension of the cross section. The diameter may be within the range mentioned above.

According to some embodiments, the cross-sectional area of the cooling micro-channels 11 may be in the range of about 0.2 and about 7 mm$^2$, and preferably between about 0.8 and about 5 mm$^2$.

The length of each cooling micro-channel 11 depends upon the dimension of the pad 5 and on the orientation of the cooling micro-channel 11, since each cooling micro-channel extends from one side surface to another side surface of the pad as shown in the exemplary embodiments disclosed herein.

As best shown in FIGS. 4, 5, 6 and 7, the cooling micro-channels 11 are arranged according to a three-dimensional pattern, i.e. according to rows and columns distributed according to the radial direction and to the axial direction, with respect to the bearing axis. The pitch between adjacent cooling micro-channels 11 in the radial direction as well as in the axial direction may be selected based on several considerations, among which the cross-sectional shape and dimension of the cooling micro-channels, on nature of the material used for manufacturing of the pads, the kind of additive manufacturing process used.

As mentioned above, the pads 5 can be manufactured by additive manufacturing, e.g. by means of by selective laser melting or selective laser sintering. Additive manufacturing allows cooling micro-channels 11 of suitable shape and dimension to be obtained across the whole thickness of the pad 5, such that cooling lubricant can flow through substantially the entire core layer 7 of the pad 5. Cooling is possible also near the coating layer 9, thus preventing or reducing thermal damages of the Babbit metal or white metal forming the coating.

In operation, the lubrication fluid which fills the lubrication fluid volume V is caused to forcedly flow through the cooling micro-channels 11, entering at the inlet ends thereof and exiting at the outlet ends thereof. Since a continuous circulation of lubrication fluid through the bearing 1 is maintained by an outer lubrication pump, heat is continuously removed by the lubrication fluid exiting the bearing 1 and replaced by fresh, cold lubrication fluid provided by an external circulation and refrigeration circuit, not shown and known in the art. Efficient cooling of the pads 5 is obtained with a very simple mechanical structure.

Whereas FIGS. 1, 2, 3, 4, 5, 6, 7 and 8 illustrate a thrust bearing 1 according to the present disclosure, in other embodiments the bearing may be configured as a radial bearing or journal bearing.

An exemplary embodiment of a radial bearing according to the present disclosure is schematically shown in FIGS. 9 and 10. The radial bearing 101 includes a housing structure 103 surrounding an axis A-A of the bearing 101. Radial pads 105 are mounted on the housing structure 103 facing the axis A-A. The pads 105 are preferably tilting pads. Each pad has a bearing surface 105.1 and a back surface 105.2. Devices 105.3 are provided at the back surface 105.2 for connection to the housing structure 103. The bearing surface 105.1 is approximately cylindrical to define a clearance between the bearing surface 105.2 and the surface of a shaft (not shown in FIGS. 9 and 10) rotatably supported in the bearing 101.

Each pad 105 further includes a leading side surface 105.4 and a trailing side surface 105.5. The leading side surface 105.4 is located upstream of the trailing side surface 105.5 with respect to the direction of rotation F of a shaft, not shown in FIGS. 9 and 10, mounted for rotation in a shaft receiving space 102. The leading side surface 105.4 and the trailing side surface 105.5 can be planar and can extend radially with respect to the axis A-A of the bearing 101, i.e. each of them can lie on a geometrical plane containing the axis A-A.

As best shown in the sectional view of FIG. 9, each pad 105 comprises a core layer 107 and a coating layer 109. The coating layer 109 forms the bearing surface 105.1 of the pad 105.

In the core layer 107 of each pad 105 a plurality of cooling micro-channels 111 are provided.

The cooling micro-channels 111 can be arranged in a matrix, and can be arranged according to rows parallel to the axis A-A of the bearing 101 and can be further arranged according to columns orthogonal to the axis A-A of the bearing 101.

In some embodiments, as best shown in FIG. 9, the cooling micro-channels 111 can have an inlet end on the leading side surface 105.4, and an outlet end on the trailing side surface 105.5. The cooling micro-channels 111 can have an arcuate shape extending around the axis A-A of the bearing 101. In other embodiments, not shown, at least some of the cooling micro-channels 111 can have an inlet end on the leading side surface 105.4 and an outlet end on the back surface 105.2 of the pad 105.

In general, the orientation of the cooling micro-channels 111 is such that lubricant fluid circulating in the lubrication fluid volume between the housing structure 103 and the shaft S (not shown in FIGS. 9 and 10) is caused to forcedly circulate through the cooling micro-channels 111 entering through the inlet ends and exiting through the outlet ends thereof.

The pads 105 can be manufactured by additive manufacturing as described above in connection with the pads 5. The direction of growth can be parallel to the direction of the axis A-A of the bearing 101. Thus, the cooling micro-channels 111 may have an elongated or elliptical cross section, with a major axis parallel to the direction of axis A-A.

In some embodiments one, some or all pads 105 can be provided with a seat for a temperature sensor, not shown, similarly to the thrust bearing 1 described above. The cooling micro-channels 111 can be suitably shaped such as to extend around the temperature sensor seat, without intersecting the seat, so that the cooling lubricant flow does not alter the temperature detected by the temperature sensors.

FIG. 11 illustrates a schematic of a turbomachine 201, including a casing 203 and a rotor 205 rotatingly housed in the casing 203 for rotation therein. The shaft S of the rotor 205 is supported by bearings, at least one of which is designed according to the present disclosure. In the embodiment of FIG. 11 two journal or radial bearings 101 and one thrust bearing 1 are shown.

During operation, the rotation of shaft S in the bearings 1, 101 promotes the circulation of lubrication fluid through the cooling micro-channels 11 and 111, thus removing heat from the pads 5, 105. FIG. 12 shows a flow chart of the method of operating the bearings 1 and 101 of the turbomachine 201.

In the above described embodiments cooling micro-channels having a smooth inner surface and a circular or elliptical cross section have been mentioned. Other cross-sectional shapes can be used in order to further improve the thermal efficiency of the bearing, in terms of heat removal. By using additive manufacturing technology to produce the bearing pads, virtually any shape can be chosen for the cooling micro-channels. For instance, cooling micro-channels having a multi-lobe cross section may be beneficial in terms of increased heat exchange surface and reduced head loss. The cross section can be constant or may vary along the development of the cooling micro-channels. For instance, a non-circular cross section can rotate along the axis of the cooling micro-channel.

While the foregoing is directed to embodiments of the disclosure, other and further embodiments of the disclosure may be devised without departing from the basic scope thereof, and the scope thereof is determined by the claims that follow.

Various embodiments of the invention are contained in one or more of the following clauses, which can be combined in any suitable fashion unless otherwise indicated herein:

Clause 1) A bearing for supporting a shaft rotating around a bearing axis, the bearing comprising a housing structure and a plurality of pads; wherein each pad is coupled with the housing structure and comprises a bearing surface, adapted to co-act with a rotary shaft supported by the bearing; wherein between the housing structure and a shaft receiving space a lubrication fluid volume is provided; in operation said lubrication fluid volume being filled with lubrication fluid circulating therein; wherein each pad comprises a plurality of cooling micro-channels; wherein each cooling micro-channel has an inlet end and an outlet end in fluid communication with said lubrication fluid volume; and wherein said cooling micro-channels are oriented such that circulation of lubrication fluid in the lubrication fluid volume promotes flow of the lubrication fluid through the cooling micro-channels.

Clause 2) A bearing comprising a housing and a plurality of pads; wherein each pad comprises a bearing surface, a leading side surface and a trailing side surface; wherein each pad further comprises a plurality of cooling micro-channels; and wherein each cooling micro-channel has an inlet end arranged on the leading side surface and an outlet end arranged on the trailing side surface of the pad.

Clause 3) The bearing of clause 1 or 2, wherein the bearing is configured as a thrust bearing; wherein the bearing surface of each pad is essentially planar; and wherein each pad has a circumferential inner side surface, a circumferential outer side surface, a radial leading side surface and a radial trailing side surface.

Clause 4) The bearing of clause 1 or 3, wherein the inlet end of at least one cooling micro-channel is positioned along the leading side surface and the outlet end of said at least one cooling micro-channel is located along the trailing side surface.

Clause 5) The bearing of one or more of the preceding clauses, wherein the inlet end of at least one cooling micro-channel is located along the leading side surface and the outlet end of said at least one cooling micro-channel is located along the circumferential outer side surface.

Clause 6) The bearing of one or more of the preceding clauses, wherein the inlet end of at least one cooling micro-channel is located along the circumferential inner side surface and the outlet end of said at least one cooling micro-channel is located along the trailing side surface.

Clause 7) The bearing of one or more of the preceding clauses, wherein the inlet end of each cooling micro-channel is arranged at a first radial distance from a bearing axis and the outlet end of each cooling micro-channel is arranged at a second radial distance from the bearing axis, the first distance being smaller than the second distance, such that each cooling micro-channel extends radially away from the bearing axis from the inlet end to the outlet end, such that lubrication fluid enters each cooling micro-channel at the inlet end and exits at the outlet end of the respective cooling micro-channel moving in a radial outward direction.

Clause 8) The bearing one or more of the preceding clauses, wherein in a cross section of each pad, according to a plane containing the axis of the bearing, the cooling micro-channels are distributed according to a matrix having rows of cooling micro-channels extending in a radial direction, a plurality of said rows being superposed in an axial direction.

Clause 9) The bearing of one or more of the preceding clauses, wherein the cooling micro-channels are distributed according to a plurality of parallel layers arranged one adjacent to the other in a radial direction, subsequent layers of cooling micro-channels being arranged at increasing distance from the bearing axis.

Clause 10) The bearing of one or more of the preceding clauses, wherein the cooling micro-channels are distributed according to a plurality of parallel layers arranged one adjacent to the other along a direction parallel to the bearing axis.

Clause 11) The bearing of one or more of the preceding clauses, wherein the bearing is configured as a radial bearing; wherein the housing structure surrounds the shaft receiving space; wherein the bearing surface of each pad is essentially cylindrical and surrounds the shaft receiving space; and wherein each pad has a leading side surface and a trailing side surface extending parallel to the axis of the bearing.

Clause 12) The bearing of clause 11, wherein at least one cooling micro-channel extends from the leading side surface to the trailing side surface.

Clause 13) The bearing of clause 11 or 12, wherein at least one cooling micro-channel extends from the leading side surface to a back surface of the pad.

Clause 14) The bearing of one or more of the preceding clauses, wherein in a cross section of each pad, according to a plane containing the axis of the bearing, the cooling micro-channels are distributed according to a matrix having rows of cooling micro-channels extending in a broadly radial direction, a plurality of said rows being arranged sequentially along an axial direction.

Clause 15) The bearing of clause 14, wherein the matrix has rectangular or rhomboidal meshes, the cooling micro-channels being arranged at the nodes of the meshes.

Clause 16) The bearing of one or more of the preceding clauses, wherein said pads are manufactured by additive manufacturing.

Clause 17) The bearing of one or more of the preceding clauses, wherein said cooling micro-channels have an elliptical cross-sectional shape, with a major axis and a minor axis, and wherein the major axis is parallel to the axis of the bearing.

Clause 18) The bearing of one or more of the preceding clauses, wherein each pad has a core layer and a coating layer, the coating layer being preferably made of Babbit metal or white metal; and wherein the cooling micro-channels are provided in the core layer.

Clause 19) A rotary machine comprising: a casing; a rotor arranged for rotation in the casing and supported by at least one bearing according to any one of the preceding clauses and preferably by at least two radial bearings and one thrust bearing according to any one of the preceding clauses.

The invention claimed is:

1. A thrust bearing for supporting a shaft rotating around a bearing axis, the thrust bearing comprising:
    a housing structure;
    a plurality of pads, each pad coupled with the housing structure and comprising:
        a bearing surface adapted to co-act with a rotary shaft supported by the bearing;
        an opposite back surface directed towards the housing structure;
        a radial leading side surface and a radial trailing side surface, the radial leading side surface and the radial trailing side surface extending radially with respect to the bearing axis;
    a shaft receiving space;
    a lubrication fluid volume between the housing structure and the shaft receiving space, wherein in operation the lubrication fluid volume is filled with lubrication fluid circulating therein,
    wherein each pad comprises a plurality of cooling micro-channels, each cooling micro-channel has an inlet end and an outlet end in fluid communication with said lubrication fluid volume and is oriented such that circulation of lubrication fluid in the lubrication fluid volume promotes flow of the lubrication fluid through the cooling micro-channels, and the inlet end of at least one of said cooling micro-channels is positioned along the radial leading side surface of the respective pad,
    wherein the bearing surface of each pad is essentially planar,
    wherein each pad has a circumferential inner side surface and a circumferential outer side surface, and
    wherein the inlet end of each cooling micro-channel is arranged at a first radial distance from the axis of the bearing and the outlet end of each cooling micro-channel is arranged at a second radial distance from the axis of the bearing, the first distance being smaller than the second distance, such that each cooling micro-channel extends radially away from the axis of the bearing from the inlet end to the outlet end, such that lubrication fluid enters each cooling micro-channel at the inlet end and exits at the outlet end of the respective cooling micro-channel moving in a radial outward direction.

2. The thrust bearing of claim 1, wherein the outlet end of said at least one cooling micro-channel is positioned along the trailing side surface.

3. The thrust bearing of claim 1, wherein the outlet end of said at least one cooling micro-channel is positioned along the circumferential outer side surface.

4. The thrust bearing of claim 1, wherein the inlet end of at least one cooling micro-channel is positioned along the circumferential inner side surface and the outlet end of said at least one cooling micro-channel is positioned along the trailing side surface.

5. The thrust bearing of claim 1, wherein in a cross section of each pad, according to a plane containing the axis of the bearing, the cooling micro-channels are distributed according to a matrix having rows of cooling micro-channels extending in a radial direction, a plurality of said rows being superposed in an axial direction.

6. The bearing of claim 1, wherein said pads are manufactured by additive manufacturing.

7. The bearing of claim 1, wherein each pad has a core layer and a coating layer, the coating layer being made of Babbit metal or white metal, and wherein the cooling micro-channels are provided in the core layer.

8. A bearing for supporting a shaft rotating around a bearing axis, the bearing comprising:
    a housing structure;
    a plurality of pads, each pad coupled with the housing structure and comprising:
        a bearing surface adapted to co-act with the shaft;
        an opposite back surface directed towards the housing structure;
        a radial leading side surface and a radial trailing side surface, the radial leading side surface and the radial trailing side surface extending radially with respect to the bearing axis; and
    a shaft receiving space;
    a lubrication fluid volume between the housing structure and the shaft receiving space,
    wherein in operation the lubrication fluid volume is filled with lubrication fluid circulating therein,
    wherein each pad comprises a plurality of cooling micro-channels, each cooling micro-channel has an inlet end and an outlet end in fluid communication with said lubrication fluid volume and is oriented such that circulation of lubrication fluid in the lubrication fluid volume promotes flow of the lubrication fluid through the cooling micro-channels, and the inlet end of at least one of said cooling micro-channels is positioned along the radial leading side surface of the respective pad, and
    wherein, in a cross section of each pad according to a plane containing the axis of the bearing, the cooling micro-channels are distributed according to a matrix having rows of cooling micro-channels extending in a radial direction, a plurality of said rows being arranged sequentially along an axial direction.

9. The bearing of claim 8, wherein the bearing is configured as a radial bearing.

10. The bearing of claim 8, wherein said at least one cooling micro-channel extends from the leading side surface to the trailing side surface or to the back surface of the pad.

11. The bearing of claim 8, wherein said pads are manufactured by additive manufacturing.

12. The bearing of claim 8, wherein the housing structure surrounds the shaft receiving space.

13. The bearing of claim 8, wherein the bearing surface of each pad is essentially cylindrical and surrounds the shaft receiving space.

14. The bearing of claim 8, wherein the leading side surface and a trailing side surface of each pad extend parallel to the axis of the bearing.

15. A bearing for supporting a shaft rotating around a bearing axis, the bearing comprising:
a housing structure;
a plurality of pads, each pad coupled with the housing structure and comprising:
a bearing surface adapted to co-act with the shaft;
an opposite back surface directed towards the housing structure;
a radial leading side surface and a radial trailing side surface, the radial leading side surface and the radial trailing side surface extending radially with respect to the bearing axis; and
a shaft receiving space;
a lubrication fluid volume between the housing structure and the shaft receiving space,
wherein in operation the lubrication fluid volume is filled with lubrication fluid circulating therein,
wherein each pad comprises a plurality of cooling micro-channels, each cooling micro-channel has an inlet end and an outlet end in fluid communication with said lubrication fluid volume and is oriented such that circulation of lubrication fluid in the lubrication fluid volume promotes flow of the lubrication fluid through the cooling micro-channels, and the inlet end of at least one of said cooling micro-channels is positioned along the radial leading side surface of the respective pad, and
wherein said cooling micro-channels have an elliptical cross-sectional shape, with a major axis and a minor axis, and wherein the major axis is parallel to the axis of the bearing.

16. The bearing of claim 15, wherein said pads are manufactured by additive manufacturing.

17. The bearing of claim 15, wherein the housing structure surrounds the shaft receiving space.

18. The bearing of claim 15, wherein the bearing surface of each pad is essentially cylindrical and surrounds the shaft receiving space.

19. A rotary machine comprising:
a casing; and
a rotor arranged for rotation in the casing and supported by at least one bearing according to claim 15.

20. A method of operating a bearing of claim 15, wherein a shaft is rotatably supported in a shaft receiving space of the bearing, the method comprising:
rotating the shaft in the shaft receiving space while supplying lubricant fluid between the housing structure and the rotating shaft, so as to provide a hydrodynamic lubrication wedge between the bearing surface of the pads and a shaft surface; and
forcing lubrication fluid to flow through the cooling micro-channels.

* * * * *